(12) United States Patent
Tokozakura

(10) Patent No.: US 11,518,273 B2
(45) Date of Patent: Dec. 6, 2022

(54) COOLING DEVICE FOR VEHICLE

(71) Applicant: TOYOTA JIDOSHA KABUSHIKI KAISHA, Aichi-ken (JP)

(72) Inventor: Daisuke Tokozakura, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 311 days.

(21) Appl. No.: 16/907,311

(22) Filed: Jun. 22, 2020

(65) Prior Publication Data

US 2020/0406783 A1 Dec. 31, 2020

(30) Foreign Application Priority Data

Jun. 25, 2019 (JP) .............................. JP2019-117849

(51) Int. Cl.
| | |
|---|---|
| *B60K 11/02* | (2006.01) |
| *B60L 58/26* | (2019.01) |
| *H01M 10/613* | (2014.01) |
| *B60K 1/00* | (2006.01) |

(52) U.S. Cl.
CPC ........... *B60L 58/26* (2019.02); *H01M 10/613* (2015.04); *B60K 11/02* (2013.01); *B60K 2001/003* (2013.01); *B60K 2001/005* (2013.01); *B60K 2001/006* (2013.01); *B60L 2240/545* (2013.01); *B60L 2240/547* (2013.01)

(58) Field of Classification Search
CPC ............... B60L 58/26; B60L 2240/547; B60L 2240/545; H01M 10/613; B60K 11/02; B60K 2001/005; B62K 2001/06
See application file for complete search history.

(56) References Cited

U.S. PATENT DOCUMENTS

| | | | |
|---|---|---|---|
| 4,415,847 A * | 11/1983 | Galloway | ............. B60L 53/302 |
| | | | 165/300 |
| 6,424,062 B1 * | 7/2002 | Adelmann | ............. H02K 9/193 |
| | | | 310/53 |
| 8,127,564 B2 | 3/2012 | Takamatsu et al. | |
| 2010/0089669 A1 * | 4/2010 | Taguchi | .................. B60L 58/15 |
| | | | 180/65.1 |
| 2012/0102995 A1 | 5/2012 | Sakata | |
| | | (Continued) | |

FOREIGN PATENT DOCUMENTS

| | | |
|---|---|---|
| JP | 2002352866 A | 12/2002 |
| JP | 2005129359 A | 5/2005 |
| | (Continued) | |

*Primary Examiner* — James A English
*Assistant Examiner* — James J Triggs
(74) *Attorney, Agent, or Firm* — Hauptman Ham, LLP

(57) ABSTRACT

A cooling device for a vehicle, includes a cooling circuit including a first circuit in which a cooling liquid circulates through a power control unit and a second circuit connected in parallel with the first circuit and in which the cooling liquid circulates through a battery without passing through the power control unit; and a flow-rate control unit that controls a proportion of a flow rate of the cooling liquid between the first circuit and the second circuit, and when the battery is being charged with the electric power of the external power supply, the control unit controls so that the flow rate of the cooling liquid flowing through the second circuit is greater than the flow rate of the cooling liquid flowing through the first circuit on a side of the power control unit.

12 Claims, 10 Drawing Sheets

(56) References Cited

U.S. PATENT DOCUMENTS

| | | | |
|---|---|---|---|
| 2013/0241486 A1* | 9/2013 | Tomokage | B60L 58/20 |
| | | | 320/109 |
| 2013/0343105 A1* | 12/2013 | Kosugi | B60L 15/2009 |
| | | | 363/56.01 |
| 2019/0036181 A1* | 1/2019 | Tokozakura | B60L 58/26 |
| 2019/0047429 A1* | 2/2019 | Torkelson | H01M 10/613 |
| 2019/0225076 A1* | 7/2019 | Takeno | H02K 9/19 |
| 2020/0231060 A1* | 7/2020 | Matsuyama | H01M 10/443 |
| 2021/0094390 A1* | 4/2021 | Aikawa | B60H 1/06 |

FOREIGN PATENT DOCUMENTS

| | | |
|---|---|---|
| JP | 2008189249 A | 8/2008 |
| JP | 201064651 A | 3/2010 |
| JP | 2011182585 A | 9/2011 |
| JP | 201293047 A | 5/2012 |
| JP | 201473802 A | 4/2014 |
| JP | 2015116872 A | 6/2015 |
| JP | 2015123922 A | 7/2015 |
| JP | 2016137773 A | 8/2016 |
| JP | 201929329 A | 2/2019 |

* cited by examiner

US 11,518,273 B2

COOLING DEVICE FOR VEHICLE

CROSS-REFERENCE TO RELATED APPLICATION(S)

The present application claims priority to and incorporates by reference the entire contents of Japanese Patent Application No. 2019-117849 filed in Japan on Jun. 25, 2019.

BACKGROUND

The present disclosure relates to a cooling device for a vehicle.

Japanese Laid-open Patent Publication No. 2015-116872 discloses a cooling device mounted in a vehicle using a motor as a motive power source, the cooling device including a cooling circuit in which cooling liquid circulates through an inverter and a battery. Further, when a radiator dissipates heat from the cooling liquid flowing in the cooling circuit, an electric fan is operated to send a current of cooling air to the radiator.

SUMMARY

There is a need for providing a cooling device for a vehicle, the cooling device having a simple structure and capable of efficiently cooling a battery and a power control unit individually according to a vehicle state.

According to an embodiment, a cooling device for a vehicle, the cooling device includes: a battery to which electric power supplied from an external power supply can be charged; a motor that outputs motive power for traveling using the electric power from the battery; a power control unit that converts DC electric power of the battery into AC electric power and supplies the AC electric power to the motor; a cooling circuit through which a cooling liquid for cooling the battery and the power control unit is circulated; an electric pump provided in the cooling circuit and that circulates the cooling liquid; a radiator provided in the cooling circuit and that dissipates heat from the cooling liquid circulating through the cooling circuit; and a control unit that controls a flow rate of the cooling liquid circulating through the cooling circuit. Further, the cooling circuit includes: a first circuit in which the cooling liquid discharged from the electric pump circulates through the power control unit; a second circuit connected in parallel with the first circuit and in which the cooling liquid discharged from the electric pump circulates through the battery without passing through the power control unit; and a flow-rate control unit that controls a proportion of a flow rate of the cooling liquid flowing in the first circuit and a flow rate of the cooling liquid flowing in the second circuit; and, when the battery is being charged with the electric power of the external power supply, the control unit controls the electric pump and the flow-rate control unit so that the flow rate of the cooling liquid flowing through the second circuit on a side of the battery is greater than the flow rate of the cooling liquid flowing through the first circuit on a side of the power control unit.

DETAILED DESCRIPTION OF THE PREFERRED EMBODIMENTS

In an electric vehicle (EV) or a plug-in hybrid vehicle (PHV), electric power supplied from an external power supply can be charged in a battery mounted in the vehicle. In this case, because the vehicle does not travel during charging from the external power supply, it is unnecessary to cool the inverter. Meanwhile, because heat generated by the battery increases during charging, it is necessary to cool the battery efficiently. In addition, when the vehicle is traveling, the heat generated by the battery decreases, compared with heat generated during charging, whereas heat generated by the inverter increases, making it necessary to cool the inverter efficiently. Thus, a state of heat generation in a target to be cooled changes according to a vehicle state. Such a state of heat generation is the same for a configuration in which a power control unit including an inverter is a target to be cooled. Therefore, it is desired that the battery and the power control unit each be efficiently cooled by a simple cooling circuit.

The configuration described in Japanese Laid-open Patent Publication No. 2015-116872 is a cooling circuit having a simple structure in which one electric pump can supply a cooling liquid to both an inverter and a battery. However, the inverter and the battery are arranged in series and, if the cooling liquid is circulated to cool the battery during charging from an external power supply, the inverter that does not require cooling is also supplied with the cooling liquid at the same flow rate as the battery and, therefore, there is room for improvement.

With reference to the accompanied drawings, a cooling device for a vehicle, according to an embodiment of the present disclosure, will now be described in detail. Note that the present disclosure is not limited by the embodiments described below.

First Embodiment

Figure 1:
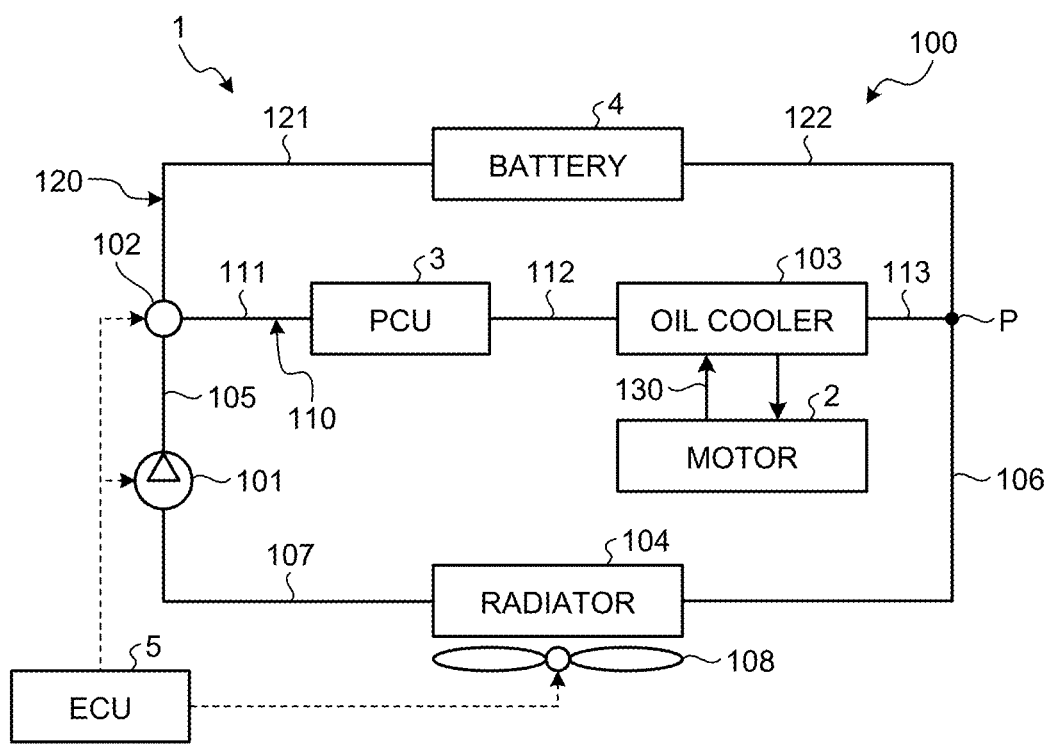
FIG. 1 is a diagram illustrating a schematic configuration of a cooling device for vehicle, according to a first embodiment.

FIG. 1 is a diagram illustrating a schematic configuration of a cooling device for a vehicle, according to the first embodiment. A cooling device 1 according to the first embodiment is mounted in the vehicle Ve using a motor 2 as a motive power source and includes a cooling circuit 100 through which a cooling liquid circulates.

The vehicle Ve includes: a motor 2 for traveling; a power control unit (hereinafter, simplified as a PCU) 3 that controls drive of the motor 2; and a battery 4 that stores electric power to be supplied to the motor 2. For example, the vehicle Ve is an electric vehicle (EV) or a plug-in hybrid vehicle (PHV).

Using electric power of the battery 4, the motor 2 outputs motive power for traveling. In the vehicle Ve, motive power output from the motor 2 is transmitted to drive wheels via a motive power transmission device. This motor 2 is electrically connected to the battery 4 via the PCU 3.

The PCU 3 includes: an inverter that drives the motor 2; a boost converter; and a DC-DC converter. For example, the inverter converts DC electric power of the battery 4 into AC electric power and supplies the AC electric power to the motor 2. This PCU 3 has a structure in which a high-voltage component is accommodated inside a PCU case (not illustrated). The PCU 3 includes at least an inverter as its parts.

The battery 4 is a power storage device that can charge electric power supplied from an external power supply. The vehicle Ve is provided with: a charging port connected to external charging equipment; and a charging device that receives electric power from an external power supply via the charging port (both are not illustrated). During charging from an external power supply, a charging plug provided for charging equipment as in a charging station and a charging port provided in the vehicle Ve are connected. By connecting the charging plug and the charging port, a state of preparation for charging is brought about. The state of preparation for charging is a state in which the external power supply and the battery 4 are connected to allow supply of an electrical current, but it means a state in which electric power has not been supplied yet. Then, when electric power is supplied from the charging plug to the battery 4 via the charging port, the charging device on the vehicle Ve side can cause an electrical current to flow in the battery 4 without passing through the PCU 3. The state in which an electrical current is flowing from the external power supply to the battery 4 is a charging state. Because an electrical current does not flow in the PCU 3 during charging, heat generation resulting from the supply of an electrical current does not occur in the PCU 3. On the other hand, since a large electrical current flows in the battery 4 during charging, the heat generation of the battery 4 increases. In particular, when a large electrical current is caused to flow by rapid charging, the calorific value of the battery 4 is further increased. In addition, an electrical current supplied to the battery 4 is larger during charging than during traveling. That is, the calorific value of the battery 4 is larger during charging than during traveling. Then, in the cooling device 1, the battery 4 is cooled using a liquid. Note that the term "during charging" includes a state of preparation for charging, before an electrical current flows, and a charging state in which an electrical current is flowing.

In addition, the cooling device 1 includes a control device (hereinafter, referred to as an Electric Control Unit or simplified as an ECU) 5 that controls the circulation of a cooling liquid through the cooling circuit 100. The ECU 5 is composed of an electronic control unit.

The cooling circuit 100 includes: a first circuit 110 for cooling the motor 2 and the PCU 3; and a second circuit 120 for cooling the battery 4. That is, the cooling circuit 100 has an oil route structure in which a route for supplying the cooling liquid to the PCU 3 and a route for supplying the cooling liquid to battery 4, which are connected in parallel. Furthermore, the cooling liquid supplied to the PCU 3 and the cooling liquid supplied to the battery 4 are the same liquid. The cooling liquid circulating through the cooling circuit 100 is a liquid having high electrical insulation. For example, the cooling liquid is composed of mineral oil, synthetic oil, silicon oil, fluorine oil or the like.

The cooling circuit 100 is configured such that one electric pump 101 allows the cooling liquid to flow toward different supply destinations. The cooling circuit 100 includes an electric pump 101, a switching valve 102, an oil cooler 103, and a radiator 104.

The electric pump 101 is driven by an electric motor (not illustrated). Drive of this electric motor is controlled by the ECU 5. That is, the ECU 5 controls drive of the electric pump 101. The electric pump 101 is operated under control by the ECU 5, and this pump sucks the cooling liquid stored in a storage portion (reservoir tank) and discharges the cooling liquid from a discharge port. A discharge oil passage 105 is connected to the discharge port of the electric pump 101. The cooling liquid discharged from the electric pump 101 to the discharge oil passage 105 is pumped downstream in the cooling circuit 100 by discharge pressure of the electric pump 101. The switching valve 102 is connected to the downstream side of the discharge oil passage 105.

The switching valve 102 is a valve that switches a route through which the cooling liquid flows, and is a flow-rate control valve that controls a proportion between a flow rate of the cooling liquid flowing in the first circuit 110 and a flow rate of the cooling liquid flowing in the second circuit 120. That is, the switching valve 102 is a flow-rate control unit. The switching valve 102 is controlled by the ECU 5. ECU 5 performs flow-rate control for the switching valve 102, thereby controlling the flow rate of the cooling liquid flowing through the first circuit 110 and controlling the flow rate of the cooling liquid flowing through the second circuit 120. For example, the switching valve 102 is composed of a three-way valve disposed at a branch point between the first circuit 110 and the second circuit 120. In addition, ECU 5 controls the switching valve 102 according to a state of the vehicle Ve, thereby switching, between the first circuit 110 and the second circuit 120, the route along which the cooling liquid can flow.

The first circuit 110 includes the electric pump 101, the discharge oil passage 105, a switching valve 102, a first supply oil passage 111, the PCU 3, a second supply oil passage 112, the oil cooler 103, a first connection oil passage 113, a confluence oil passage 106, the radiator 104, and a suction oil passage 107. The first circuit 110 forms a route in which the cooling liquid discharged from the electric pump 101 is supplied from the switching valve 102 to the PCU 3 and the oil cooler 103, and the cooling liquid caused to flow through the oil cooler 103 is supplied to the radiator 104. In the first circuit 110, the PCU 3 and the oil cooler 103 are connected in series, and the oil cooler 103 is arranged on the downstream side of the PCU 3.

The switching valve 102 is provided between the electric pump 101 and the PCU 3, in the first circuit 110. The first supply oil passage 111 is an oil passage between the switching valve 102 and the PCU 3 and is an oil passage along which the cooling liquid that has flowed into the first circuit 110 from the switching valve 102 is supplied to the PCU 3. A discharge oil passage 105 is connected to the inflow port of the switching valve 102, and a first supply oil passage 111 is connected to the first outflow port of the switching valve 102. Therefore, in a state where the switching valve 102 is allowing flow through the first circuit 110, the cooling liquid discharged by the electric pump 101 is supplied to the PCU 3 through the switching valve 102. At that time, the switching valve 102 can control the flow rate of the cooling liquid flowing into the PCU 3 from the first supply oil passage 111.

The PCU 3 includes a high-voltage component such as a power semiconductor and a PCU case that houses the high-voltage component (neither is illustrated). In the PCU 3 in the first circuit 110, the cooling liquid flows into the PCU case, and the high voltage components can be cooled by the cooling liquid inside this case. The first supply oil passage 111 is connected to the inflow port of the PCU case. The cooling liquid flows from the first supply oil passage 111 into the inside of the PCU case, comes into contact with and directly exchanges heat with the heat generating unit (high-voltage component) of the PCU 3, thereby cooling the PCU 3. The second supply oil passage 112 is connected to the outflow port of the PCU case. The second supply oil passage 112 is an oil passage between the PCU 3 and the oil cooler 103 and is an oil passage along which a cooling liquid is supplied to the oil cooler 103.

The oil cooler 103 is a heat exchanger that exchanges heat between the oil of the motor 2 and the cooling liquid of the cooling circuit 100. A motor cooling circuit 130 through which oil for cooling the motor 2 flows is connected to the oil cooler 103. Thereby, in the oil cooler 103, heat exchange between the cooling liquid and the oil of the motor 2 can be performed.

The first connection oil passage 113 is connected to the outflow port of the oil cooler 103. A confluence P where the first circuit 110 and the second circuit 120 join is provided downstream of the first connection oil passage 113. A confluence oil passage 106, which is a common oil passage for the first circuit 110 and the second circuit 120, is provided on the downstream side of the confluence P. The confluence oil passage 106 is connected to the inflow port of the radiator 104. Thus, the cooling liquid that has passed through the oil cooler 103 is supplied to the radiator 104.

The radiator 104 is a radiator that dissipates heat from the cooling liquid circulating through the cooling circuit 100 and is a heat exchanger that exchanges heat between air outside the vehicle Ve and the cooling liquid of the cooling circuit 100. The cooling liquid circulating through the cooling circuit 100 dissipates heat by exchanging heat with the outside air when flowing in the radiator 104. A suction oil passage 107 is connected to the outflow port of the radiator 104. The downstream side of the suction oil passage 107 is connected to the suction port of the electric pump 101.

In the cooling device 1, an electric fan 108 that sends a current of cooling air to the radiator 104 is provided. The electric fan 108 is driven and controlled by the ECU 5. By operating the electric fan 108, the radiator 104 can be cooled with air, and an amount of heat dissipated by the radiator 104 can be increased.

The second circuit 120 includes the electric pump 101, the discharge oil passage 105, the switching valve 102, a third supply oil passage 121, the battery 4, a second connection oil passage 122, the confluence oil passage 106, the radiator 104, and a suction oil passage 107. The second circuit 120 forms a route in which the cooling liquid discharged from the electric pump 101 is supplied from the switching valve 102 to the battery 4, and the cooling liquid caused to flow through the battery 4 is supplied to the radiator 104. The cooling liquid circulating through the second circuit 120 is supplied to the battery 4 without passing through the PCU 3.

The second circuit 120 is a parallel circuit connected in parallel with the first circuit 110. The switching valve 102 is disposed at a branch point between the first circuit 110 and the second circuit 120. The switching valve 102 in the second circuit 120 is provided between the electric pump 101 and the battery 4 and controls a flow rate for distribution between the first circuit 110 and the second circuit 120. A third supply oil passage 121 is connected to the second discharge port of the switching valve 102.

The third supply oil passage 121 is an oil passage between the switching valve 102 and the battery 4 and is an oil passage along which the cooling liquid caused to flow into the second circuit 120 from the switching valve 102 is supplied to the battery 4. In a state where the switching valve 102 is allowing flow through the second circuit 120, the cooling liquid discharged by the electric pump 101 is supplied to the battery 4 through the switching valve 102. At that time, the switching valve 102 can control the flow rate of the cooling liquid flowing into the battery 4 from the third supply oil passage 121.

In the battery 4 disposed in the second circuit 120, a plurality of battery modules 41 (illustrated in FIG. 2) housed in a battery case are kept immersed in the cooling liquid. The cooling device 1 is directed to directly cool battery cells 40 (illustrated in FIG. 2) of the battery 4 by using the cooling liquid having a high electrical insulation property and has a cooling structure (an immersion structure) in which the battery cells 40 are immersed in the cooling liquid. A third supply oil passage 121 is connected to the inflow port of the battery 4.

Figure 2:
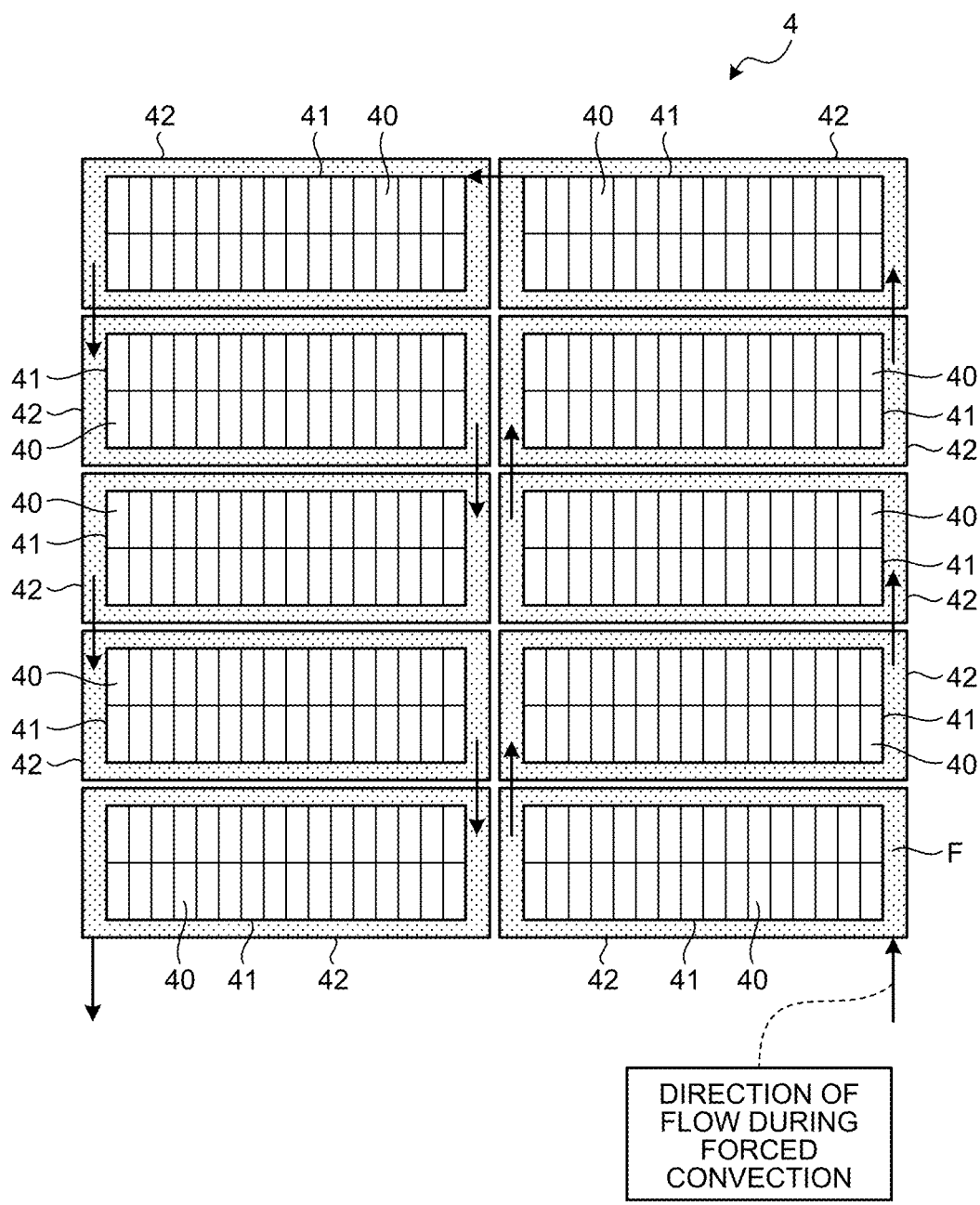
FIG. 2 is a diagram schematically illustrating an immersion structure of a battery.

As illustrated in FIG. 2, the battery 4 includes: a plurality of battery modules 41, each including a plurality of battery cells 40; and a plurality of module cases 42 accommodating the respective battery modules 41. Inside each of the module cases 42, the battery module 41 is immersed in the cooling liquid F. Thus, heat is directly exchanged between the battery cells 40 and the cooling liquid F.

The module cases 42 are connected to one another such that the cooling liquid F can flow therethrough. As illustrated in FIG. 2, in a structure in which one battery module 41 is housed in one module case 42, a flow passage for the cooling liquid F is formed by connecting the plurality of module cases 42 in series. In a connection method for the module cases 42, inflow ports and outflow ports are connected such that the cooling liquid F flows diagonally in the module cases 42. If each module case 42 is viewed from above, the module case 42 has a substantially rectangular parallelepiped shape in which an inflow port and an outflow port for the cooling liquid F are provided near diagonal positions with respect to each other. That is, when the battery 4 is viewed from above, each module case 42 is formed in a quadrangular shape, and an inflow port and an outflow port are provided near diagonal positions in the quadrangle. By virtue of this, the cooling liquid flows diagonally in a horizontal plane in the module case 42 from the inflow port to the outflow port. The arrows illustrated in FIG. 2 indicate the direction of the flow of the cooling liquid during forced convection.

Returning to FIG. 1, the cooling liquid that has passed through the battery 4 is supplied to the radiator 104. The second connection oil passage 122 is connected to the outflow port of the battery 4. The confluence P is provided on the downstream side of the second connection oil passage 122. The cooling liquid flowing out of the battery 4 flows through the second connection oil passage 122 and the confluence oil passage 106 and flows into the radiator 104.

When the cooling liquid circulates through the second circuit 120, the electric fan 108 is operated to enable the cooling liquid circulating through the second circuit 120 to be cooled with air by the radiator 104.

In the cooling device 1 configured as described above, the ECU 5 controls the electric pump 101 and the switching valve 102 according to a state of the vehicle Ve and switches the route through which the cooling liquid flows. The ECU 5 performs control for switching a flow passage in the cooling circuit 100.

Figure 3:
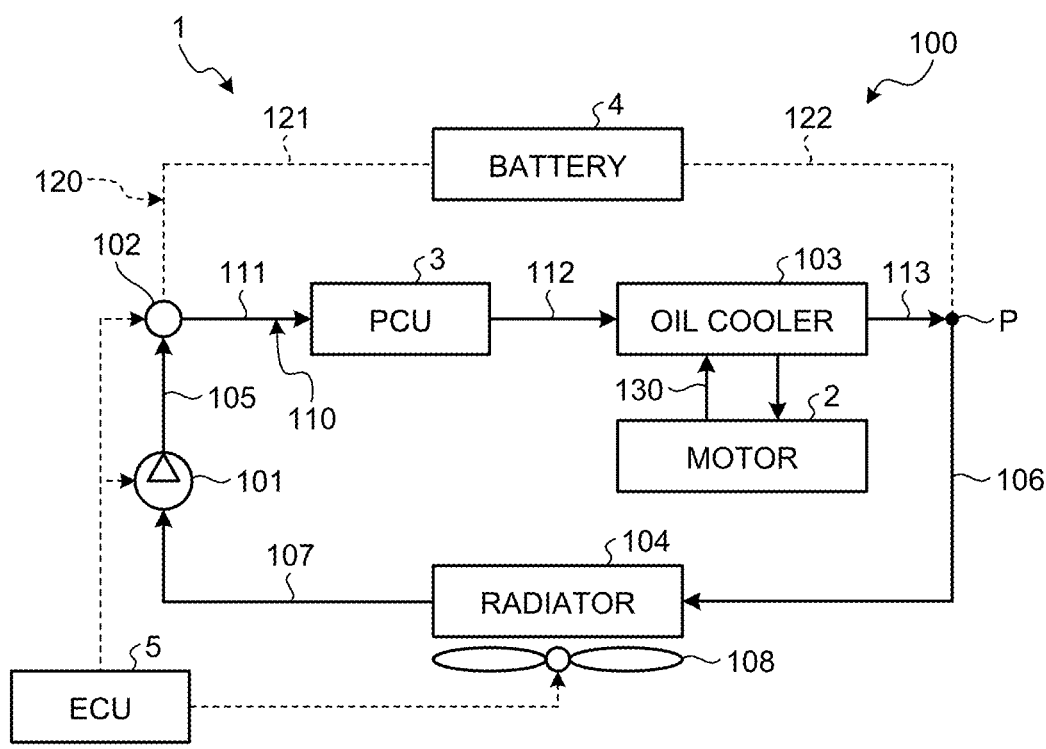
FIG. 3 is a schematic diagram illustrating a route allowing flow through a cooling circuit in a traveling state.

FIG. 3 is a schematic diagram illustrating a route allowing flow through the cooling circuit in a traveling state. As illustrated in FIG. 3, when the vehicle Ve travels with motive power of the motor 2, the switching valve 102 is switched so that, in the cooling circuit 100, the cooling liquid flows through the first circuit 110, and control is performed to cause the cooling liquid to circulate through the first circuit 110. In a traveling state, the ECU 5 controls the switching valve 102 so that the cooling liquid discharged from the electric pump 101 flows into the first circuit 110 in a large quantity in order to enhance the cooling performance of the PCU 3 and motor 2. For example, the flow passage is switched by the switching valve 102, thereby enabling the cooling liquid to be caused to flow only in the first circuit 110 during traveling.

In addition, in a traveling state, the coolability of the battery 4 can be satisfied by the cooling liquid even when the cooling liquid flows only through the first circuit 110. That is, in the battery 4, the battery cells 40 can be directly cooled with the cooling liquid, and the battery cells 40 are immersed in the cooling liquid, so that a required amount of heat generated by the battery 4 in the traveling state can be dissipated only by the natural convection of the cooling liquid.

Figure 4:
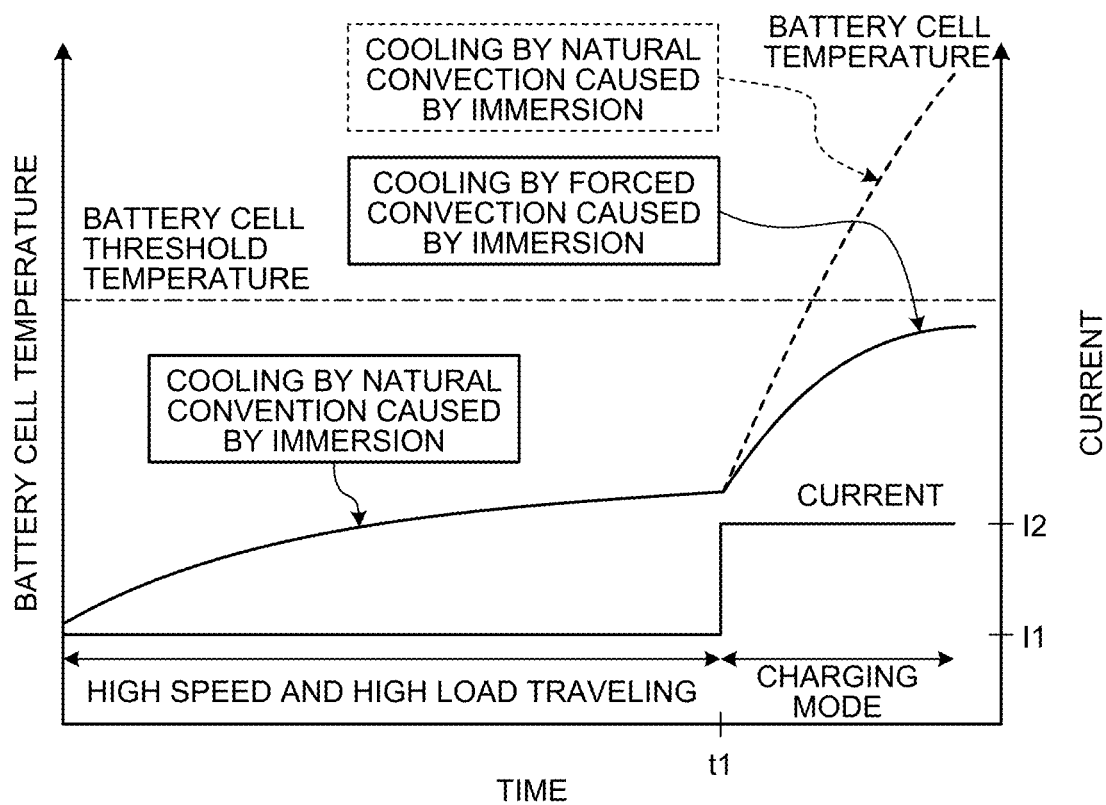
FIG. 4 is a time chart illustrating changes when cooling control is executed in accordance with a state of the vehicle.

As illustrated in FIG. 4, cooling by natural convection resulting from immersing the battery cells 40 makes it possible to maintain the temperature of the battery cells 40 at a threshold temperature or lower in a traveling state (high-speed/high-load traveling). For example, as a state in which the coolability of the battery 4 is satisfied, the temperature of the battery cells 40 can be maintained at approximately 53° C. or lower. In the battery 4 having the immersion structure, the coolability of the battery 4 during traveling can be satisfied only by the natural convection of the cooling liquid. Therefore, in a traveling state, the cooling liquid is circulated through the route allowing flow, illustrated in FIG. 3 described above. Thus, in a case where the cooling liquid does not circulate through the second circuit 120, the battery cells 40 are cooled by the natural convection of the cooling liquid in the module case 42.

Meanwhile, only cooling by the natural convection with respect to the heat generation of the battery cells 40 in the charging mode results in a rise of the temperature of the battery cells 40 above the threshold value (indicated by the broken line at and after time t1). As illustrated in FIG. 4, regarding the value of an electrical current supplied to the battery 4, the value I2 of an electrical current in a charging state is larger than the value I1 of an electrical current in a traveling state. Therefore, heat generation of the battery 4 is larger in the charging mode than that in the traveling mode. As a result, during charging from an external power supply, particularly during rapid charging, the coolability of the battery 4 cannot be satisfied only by the natural convection caused by the immersion. In addition, because the PCU 3 and the motor 2 are not operating during charging, the PCU 3 and the motor 2 do not generate heat, and there is no need to cool the PCU 3 and the motor 2. Therefore, the cooling capability of the cooling device 1 can be concentrated on using for the battery 4. That is, forced convection of the cooling liquid for cooling the battery 4 becomes possible. Therefore, during the charging mode, the temperature of the battery cell 40 can be maintained at the threshold or lower by cooling the battery cells 40 by forced convection of the cooling liquid (indicated by the solid line in FIG. 4). That is, during rapid charging from an external power supply, the coolability of the battery 4 can be satisfied by forcible convection caused by immersion.

Figure 5:
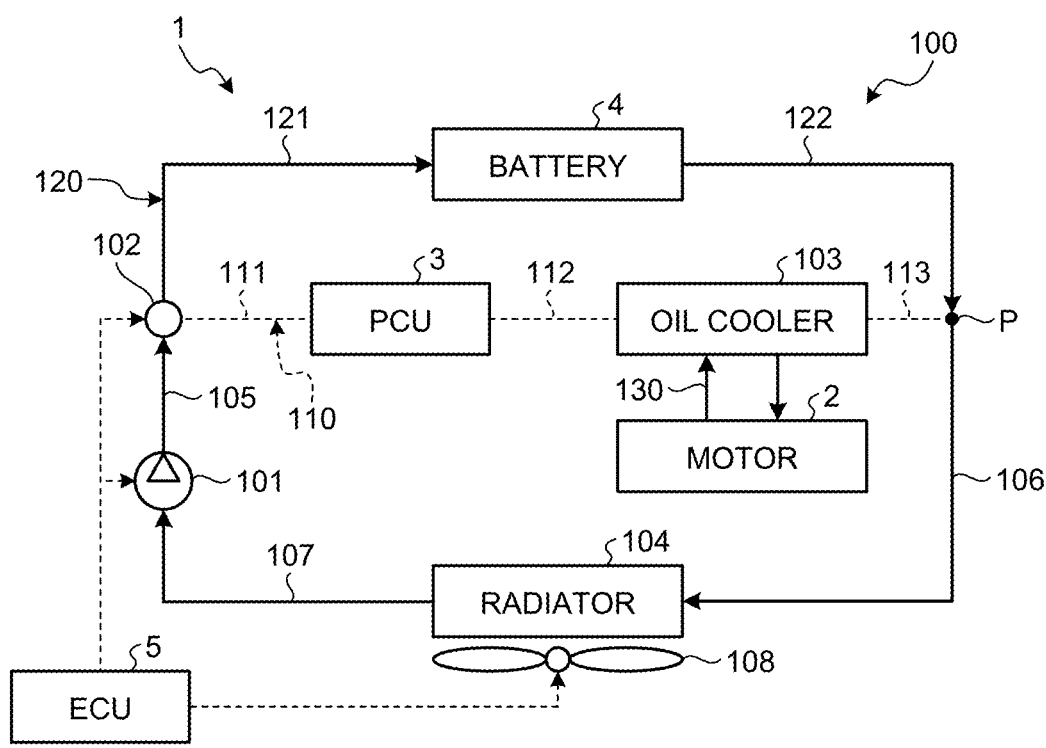
FIG. 5 is a schematic diagram illustrating a route allowing flow through the cooling circuit in a charging state.

FIG. 5 is a schematic diagram illustrating a route allowing flow through the cooling circuit in a charging state. As illustrated in FIG. 5, when charging the battery 4 with electric power from an external power supply, the ECU 5 controls the switching valve 102 so as to increase the distribution of the cooling liquid discharged from the electric pump 101 and flowing into the second circuit 120 and increase the flow rate of the cooling liquid in the second circuit 120. Thereby, the cooling performance of the battery 4 is improved. For example, by switching the flow passage by the switching valve 102, the cooling liquid may flow only in the second circuit 120 during charging.

Using the temperature of the cooling liquid as a parameter, the ECU 5 performs flow-rate control by the electric pump 101 and the switching valve 102. In this case, the cooling circuit 100 is provided with a temperature sensor (not illustrated) for detecting the temperature of the cooling liquid. A signal is input to the ECU 5 from this temperature sensor. For example, the temperature of the cooling liquid is detected by a temperature sensor provided for the battery 4.

Figure 6:
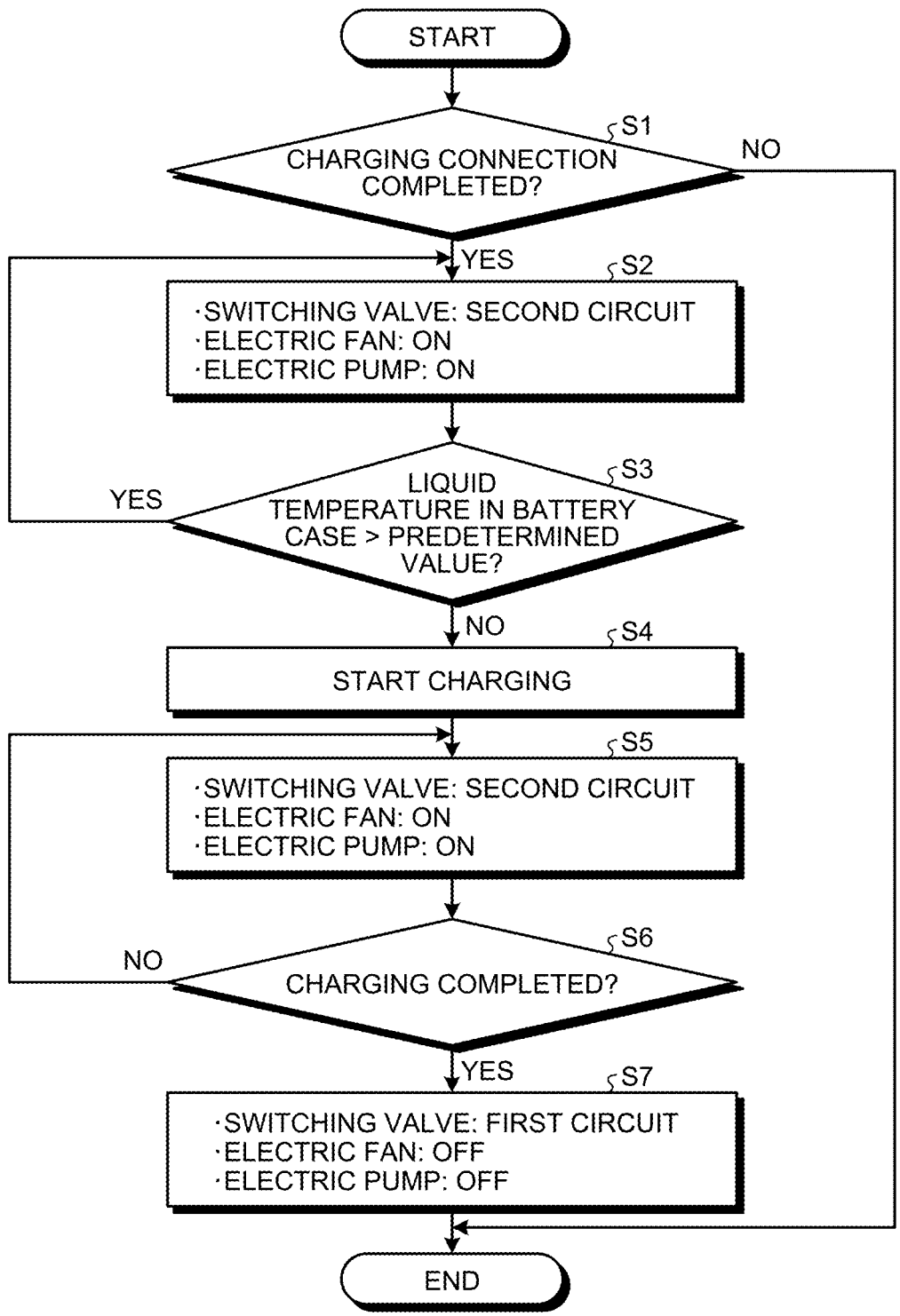
FIG. 6 is a flowchart illustrating a cooling control flow according to the first embodiment.

FIG. 6 is a flowchart illustrating a cooling control flow according to the first embodiment. The control illustrated in FIG. 6 is executed by the ECU 5.

The ECU 5 determines whether a charging connection, which is a connection state for charging the battery 4 from an external power supply, has been completed (step S1). In step S1, it is determined whether a charging plug of a charging station has been connected to the charging port of the vehicle Ve. When detecting a charging connection in which the vehicle Ve is connected to external charging equipment, the ECU 5 determines that the vehicle is in the charging mode.

If the charging connection with the external power supply has been completed (step S1: Yes), the ECU 5 controls the switching valve 102 so as to allow flow through the second circuit 120 of the cooling circuit 100, and operates the electric fan 108 and the electric pump 101 (step S2). In step S2, before charging from the external power supply is started, the cooling liquid is circulated through the second circuit 120 and the electric fan 108 is operated to cool the battery 4 with the cooling liquid forced to convect. During charging from the external power supply, the vehicle Ve is not traveling and, therefore, the radiator 104 is not exposed to the traveling wind. Accordingly, by operating the electric fan 108, the current of cooling air from the electric fan 108 is sent to the radiator 104, and the heat dissipation performance of the radiator 104 is ensured.

After step S2, the ECU 5 determines whether the temperature of the cooling liquid in the case of the battery 4 is higher than a predetermined value (step S3). In step S3, the temperature of the cooling liquid in the module case 42 can be detected by the temperature sensor provided for the battery 4. The battery 4 is provided with a temperature sensor for detecting the temperature of the battery cells 40. This temperature sensor detects the surface temperature of the battery cells 40 and, therefore, when the module case 42 is filled with the cooling liquid (for an immersing state), the temperature sensor detects the temperature of the cooling liquid. Then, based on the temperature detected by the temperature sensor, the ECU 5 makes a determination for a comparison with a predetermined value, in step S3. In addition, the predetermined value used in step S3 is set to a value lower than a temperature threshold (approximately 53° C.) for the battery cells 40. For example, the predetermined value can be set in the range of approximately 30 to 40° C.

Specifically, the predetermined value in step S3 can be set based on the relationship between the size of the radiator 104 and the discharge flow rate of electric pump 101. For example, where the radiator 104 has a large size and the discharge flow rate of the electric pump 101 is high, the predetermined value is set to approximately 40° C. If the radiator 104 has a medium size and the electric pump 101 has a medium discharge flow rate, the predetermined value is set to approximately 35° C. In addition, if the radiator 104 has a small size and the discharge flow rate of the electric pump 101 is low, the predetermined value is set to 30° C. Thus, the predetermined value used for the determination in step S3 can be set according to the heat dissipation capability of the radiator 104.

When the temperature of the cooling liquid in the case of the battery 4 is higher than the predetermined value (step S3: Yes), the control routine returns to step S2. When the temperature of the cooling liquid in the battery 4 exceeds the predetermined value in a state of preparation for charging, the ECU 5 performs step S2 to execute precooling for cooling before the start of the charging. This precooling is continued until the temperature of the cooling liquid in the battery 4 reaches the predetermined value or lower.

Before the start of the precooling, the battery 4 is in a state of being cooled with the cooling liquid naturally convecting, so that the case inlet side (the upstream side) and the case outlet side (the downstream side) are substantially equal in the temperature of the cooling liquid in the case of the battery 4. Then, when the precooling is started, the cooling liquid passes through the battery 4, so that the battery 4 shifts to a state of being cooled with the cooling liquid forced to convect. After the start of the precooling, the cooling liquid cooled by the radiator 104 is supplied to the battery 4, so that the temperature of the cooling liquid near the case inlet of the battery 4 is low and the temperature of the cooling liquid near the case outlet of the battery 4 is high, resulting in a temperature difference. Because this temperature difference decreases as the battery cells 40 are cooled, the temperature difference further decreases by continuing the precooling. Then, the precooling is continued until the temperature of the cooling liquid in the case of the battery 4 decreases to the predetermined value or lower in step S3. The execution time of this precooling is several minutes. For example, where the precooling is executed in an environment where the outside air temperature is 20° C., the execution time taken for the temperature of the cooling liquid near the case outlet of the battery 4 to reach the predetermined value or lower is approximately 3 minutes. In addition, the execution time of the precooling changes according to the outside air temperature. When the outside air temperature is high, the execution time of the precooling becomes long, and when the outside air temperature is low, the execution time of the precooling becomes short.

When the temperature of the cooling liquid in the case of the battery 4 is equal to or lower than the predetermined value (step S3: No), the ECU 5 starts charging the battery 4 from the external power supply (step S4). In step S4, an electrical current flows from the charging port on the vehicle Ve side so as to return to the charging port through the battery 4. This charging does not depend on the type of charging standard. So-called ordinary charging and rapid charging, etc., are included.

During charging from the external power supply, the ECU 5 controls the switching valve 102 so as to allow flow through the second circuit 120 of the cooling circuit 100 and operates the electric fan 108 and the electric pump 101 (step S5). In step S5, as illustrated in FIG. 5 described above, control is performed so that the cooling liquid flows through only the second circuit 120 on the side of the battery 4. In step S5, the cooling control started in step S2 is continued. That is, step S2 is precooling before the start of the charging, and step S5 is main cooling during charging. During the precooling in step S2, a charging electrical current is not flowing through the battery 4, but during the main cooling in step S5, the charging electrical current is flowing through the battery 4.

The ECU 5 determines whether the charging from the external power supply has been completed (step S6). In step S6, it is determined whether the charging plug has been removed from the charging port. The ECU 5 determines whether the connection with the external power supply has been released. In addition, in step S6, to determine the completion of the charging, it may be determined whether the charging from the external power supply to the battery 4 has been completed.

If the charging from the external power supply has not been completed (Step S6: No), this control routine returns to step S5. The ECU 5 continues the cooling control in step S5 until the charging is completed.

When the charging from the external power supply has been completed (step S6: Yes), the ECU 5 controls the switching valve 102 so as to allow flow through the first circuit 110 of the cooling circuit 100, and stops the electric fan 108 and the electric pump 101 (step S7). In step S7, the first circuit 110 is allowed to be used for flow, but because the electric pump 101 is stopped, the cooling liquid does not flow in the first circuit 110. By performing step S7, the cooling state of the battery 4 shifts from the cooling by the forced convection to cooling by natural convection. After step S7, this control routine ends.

As described above, according to the cooling device 1 according to the first embodiment, the battery 4 and the PCU 3 each can efficiently be cooled according to a state of the vehicle Ve. The battery cell 40 can directly be cooled with the cooling liquid having high electrical insulation properties and, for heat generation of the battery 4 during traveling, immersion of the battery cells 40 enables a required amount of heat to be dissipated by natural convection without causing the cooling liquid to flow. That is, during traveling, the cooling liquid is not caused to flow through the battery 4 but can be caused to flow through only the first circuit 110 in which the PCU 3 and the motor 2 that generate a large quantity of heat are arranged. Therefore, because heat dissipation by the cooling liquid and the radiator 104 can be concentrated on cooling the PCU 3 and the motor 2, the coolability of the PCU 3 and the motor 2 is improved. Thus, a reduction in the loss of the power semiconductor of the PCU 3 and a reduction in the copper loss of the motor 2 can be expected. Furthermore, because the electric pump 101 does not need to be operated for the battery 4 during traveling, an electricity cost in the traveling mode is improved.

Further, although heat generation of the battery 4 increases during charging, particularly during rapid charging, the coolability of the battery 4 can be satisfied by switching the cooling liquid in the module case 42 from natural convection to forced convection. Furthermore, because the PCU 3 and the motor 2 do not operate during charging, there is no heat generation in the PCU 3 and the motor 2. Therefore, during charging, the cooling liquid can be caused to flow only into the second circuit 120 on the side of the battery 4.

In addition, because, in the cooling circuit 100, pipe arrangement (route) on the outlet side of the radiator 104 can be simplified, the pipes can be reduced or shortened. Thus, the structure of the cooling circuit 100 can be simplified, and the cost of the cooling element can be reduced.

In addition, according to the cooling device 1, because the flow rate of the cooling liquid required for cooling can be reduced, the capacity of the electric pump 101 can be reduced. Furthermore, the number of electric pumps can be reduced as compared with a configuration in the related art in which electric pumps for a battery must be kept operated in order to cool the battery. Thus, the structure of the cooling circuit 100 can be simplified, and the cost of the cooling element can be reduced.

Note that the first embodiment may be modified. First, as an example of the modification of the first embodiment, a chiller may be provided in place of the radiator 104. In the case of the chiller, the electric fan 108 is unnecessary. This chiller is a heat exchanger that is disposed between the confluence oil passage 106 and the suction oil passage 107 and that performs heat exchange between the refrigerant of a refrigeration cycle and the cooling liquid of the cooling circuit 100. Therefore, the ECU 5 operates the refrigeration cycle instead of operating the electric fan 108. Thereby, the refrigerant of the refrigeration cycle flows through the chiller, and the cooling liquid of the cooling circuit 100 can be cooled with the refrigerant of the refrigeration cycle.

Figure 7:
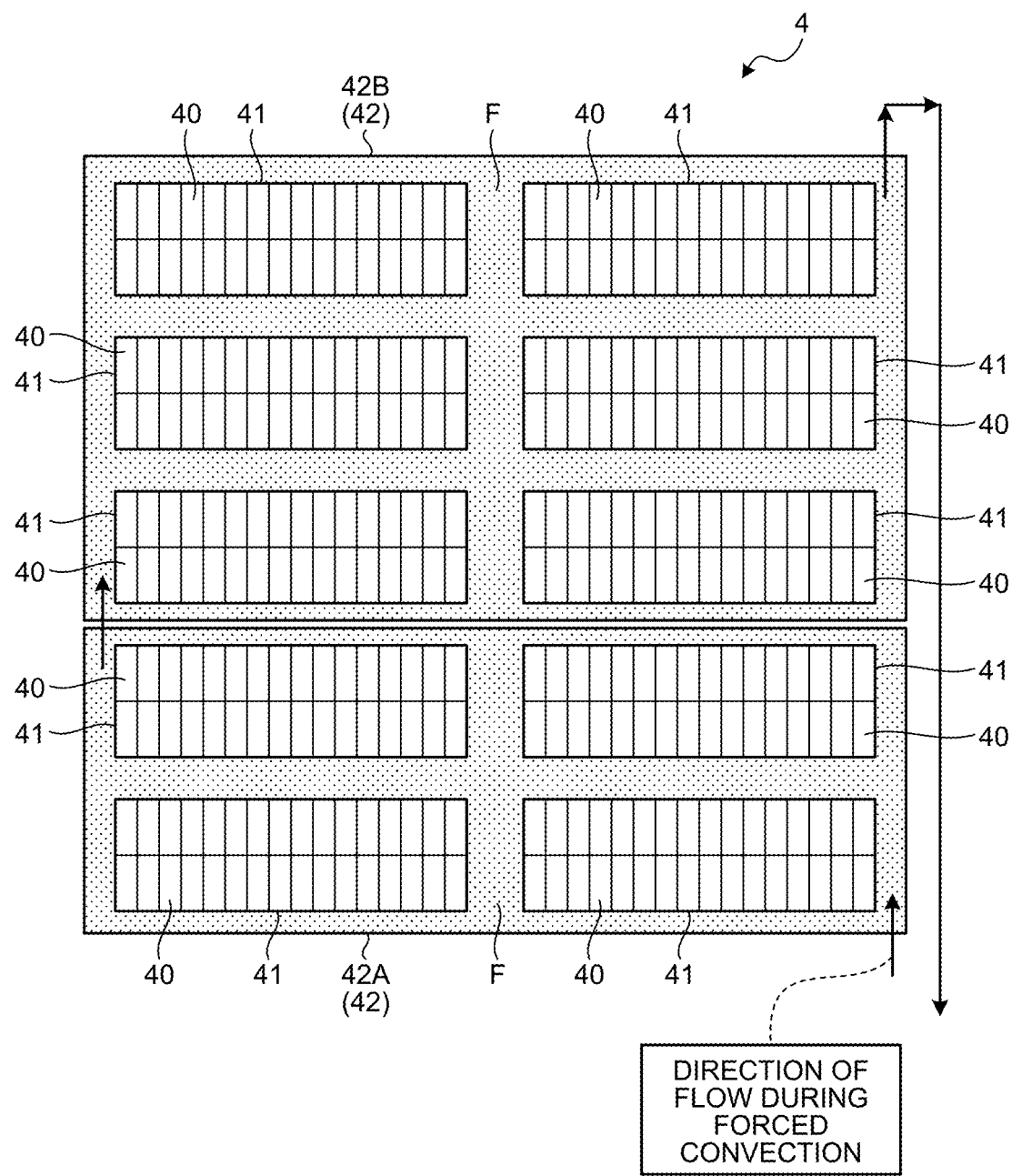
FIG. 7 is a diagram schematically illustrating a modified example of the immersion structure of the battery.

In addition, as a further example of the modification, the immersion structure of the battery 4 may be changed. For immersion of the battery 4 in the cooling liquid, the module case 42 can be configured to be large in order to increase the heat capacity. For example, as illustrated in FIG. 7, the further example of the modification has an immersion structure in which a plurality of battery modules 41 are housed in one module case 42. The example illustrated in FIG. 7 includes: a first module case 42A that houses four battery modules 41; and a second module case 42B that houses six battery modules 41. The first module case 42A is arranged on the upstream side. The second module case 42B is arranged on the downstream side. The outflow port of the first module case 42A is connected to the inflow port of the second module case 42B. Thereby, the cooling liquid flows diagonally in the first and second module cases 42A, 42B.

As a still further example of the modification, in step S1 of FIG. 6, instead of determining whether the charging connection has been completed, the ECU 5 may determine whether the vehicle Ve is in a state of preparation for charging from an external power supply. The state of preparation for charging includes a case where it is detected that the charging port of the vehicle Ve is opened and a case where it is detected that a charging plug is connected to the charging port of the vehicle Ve.

As a yet further example of the modification, the cooling circuit 100 may be such that a flow-rate adjusting valve capable of allocating an arbitrary flow rate is disposed instead of the switching valve 102. The flow-rate adjustment valve is a valve disposed at the branch point between the first circuit 110 and the second circuit 120 and allocates an arbitrary flow rate of the cooling liquid flowing in the first circuit 110 and an arbitrary flow rate of the cooling liquid flowing in the second circuit 120. That is, the flow-rate adjustment valve is a flow-rate control unit. According to this flow-rate adjustment valve, the cooling liquid can be caused to flow through both the first circuit 110 and the second circuit 120. Furthermore, the flow-rate adjustment valve is controlled by the ECU 5. ECU 5 performs flow-rate control for the flow-rate adjustment valve, thereby controlling the flow rate of the cooling liquid flowing through the first circuit 110 and controlling the flow rate of the cooling liquid flowing through the second circuit 120. For example, the ECU 5 may control the electric pump 101 and the flow-rate adjustment valve so that, during traveling, the flow rate of the cooling liquid flowing through the first circuit 110 is higher than the flow rate of the cooling liquid flowing through the second circuit 120 while the cooling liquid is caused to flow through the first circuit 110 and the second circuit 120. In addition, the ECU 5 may control the electric pump 101 and the flow-rate adjustment valve so that, during charging the battery 4 from an external power supply, the flow rate of the cooling liquid flowing through the second circuit 120 is higher than the flow rate of the cooling liquid flowing through the first circuit 110 while the cooling liquid is caused to flow through the first circuit 110 and the second circuit 120. In addition, the ECU 5 may control the electric pump 101 and the flow-rate adjustment valve so that, in a state of preparation for charging, the flow rate of the cooling liquid flowing through the second circuit 120 is higher than the flow rate of the cooling liquid flowing through the first circuit 110 while the cooling liquid is caused to flow through the first circuit 110 and the second circuit 120.

In addition, as a still further example of the modification, the ECU 5 can control the electric pump 101 and the flow-rate adjustment valve so that, either in a state of preparation for charging or during the charging, the flow rate of the cooling liquid flowing through the second circuit 120 is higher than the flow rate of the cooling liquid flowing through the first circuit 110. That is, in the first embodiment described above, the cooling liquid is caused to flow through the second circuit 120 both in the state of preparation for charging and during the charging, but the present disclosure is not limited thereto. For example, the electric pump 101 may be driven during charging, and the electric pump 101 may be stopped in a state of preparation for the charging. In this case also, the flow-rate adjustment unit may be either the switching valve 102 or the flow-rate adjustment valve.

Second Embodiment

Figure 8:
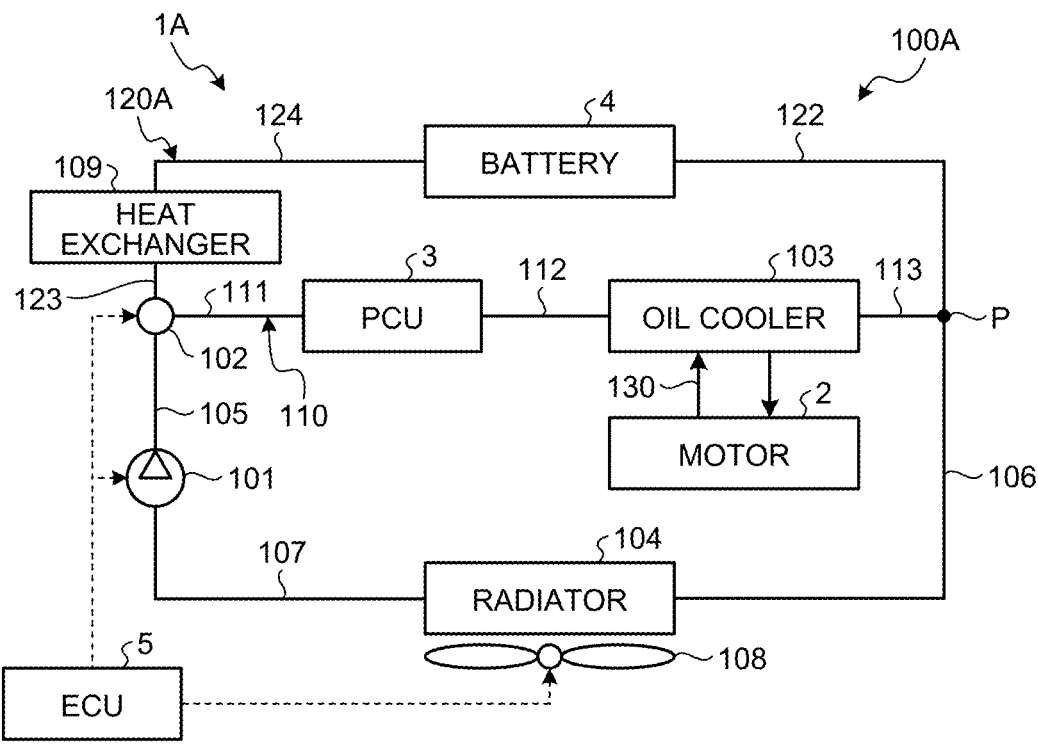
FIG. 8 is a diagram illustrating a schematic configuration of a cooling device for vehicle, according to a second embodiment.

FIG. 8 is a diagram illustrating a schematic configuration of a cooling device for a vehicle, according to the second embodiment. In the description of the second embodiment, a description of the same configuration as that of the first embodiment will be omitted, and a reference symbol attached thereto will be similarly quoted.

As illustrated in FIG. 8, in a cooling device 1A of the second embodiment, a second circuit 120A of a cooling circuit 100A includes a heat exchanger 109. The heat exchanger 109 is provided between a switching valve 102 and a battery 4 in the second circuit 120A. The heat exchanger 109 is composed of a chiller that performs heat exchange between a cooling liquid flowing in the second circuit 120A and a refrigerant of a refrigeration cycle. The illustration of the detailed configuration of the refrigeration cycle is omitted.

Specifically, the second circuit 120A is configured so that the cooling liquid discharged from an electric pump 101 flows from the switching valve 102 to the battery 4 through the heat exchanger 109. A third supply oil passage 123 is connected to the second discharge port of the switching valve 102.

The third supply oil passage 123 is an oil passage between the switching valve 102 and the heat exchanger 109 and is an oil passage along which the cooling liquid caused to flow into the second circuit 120A from the switching valve 102 is supplied to the heat exchanger 109. In a state where the switching valve 102 connects the second circuit 120A so as to allow flow therethrough, the cooling liquid discharged by the electric pump 101 is supplied to the heat exchanger 109 through the switching valve 102. At this time, the switching valve 102 can control the flow rate of the cooling liquid flowing into the heat exchanger 109 from the third supply oil passage 123.

The chiller composing the heat exchanger 109 is connected to the refrigeration cycle of an air conditioner. Therefore, when the refrigeration cycle operates, the refrigerant of the refrigeration cycle flows through the inside of the heat exchanger 109. The refrigerating cycle is provided with a compressor. By the operation of the compressor, the refrigeration cycle operates to supply the refrigerant of the refrigeration cycle to the heat exchanger 109. In addition, in the second circuit 120A, a fourth supply oil passage 124 is connected to the outflow port of the heat exchanger 109.

The fourth supply oil passage 124 is an oil passage between the heat exchanger 109 and the battery 4 and is an oil passage along which the cooling liquid caused to flow out from the heat exchanger 109 is supplied to the battery 4. In the second circuit 120A, the cooling liquid cooled by the heat exchanger 109 is supplied to the battery 4.

Figure 9:
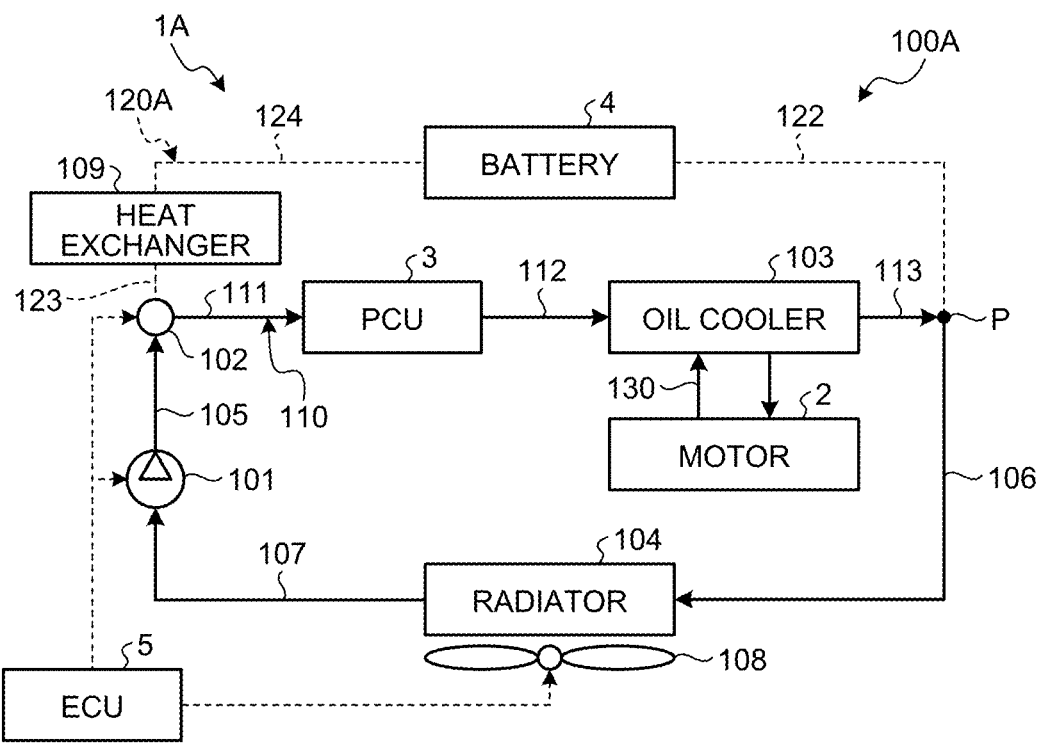
FIG. 9 is a schematic diagram illustrating a route allowing flow through a cooling circuit in a traveling state.

FIG. 9 is a schematic diagram illustrating a route allowing flow through the cooling circuit in a traveling state. As illustrated in FIG. 9, in a traveling state, because the cooling liquid flows only through the first circuit 110, heat exchange in the heat exchanger 109 on the side of the second circuit 120A is unnecessary. During traveling, the ECU 5 can stop the compressor of the refrigeration cycle and stop heat exchange in the heat exchanger 109. This means that it is not necessary to operate the compressor of the refrigeration cycle to cool the battery 4. In other words, in a case where the air conditioner is operated by the driver during charging in order to request to cool a vehicle cabin, the compressor of the refrigeration cycle can be operated to cool the vehicle cabin.

Figure 10:
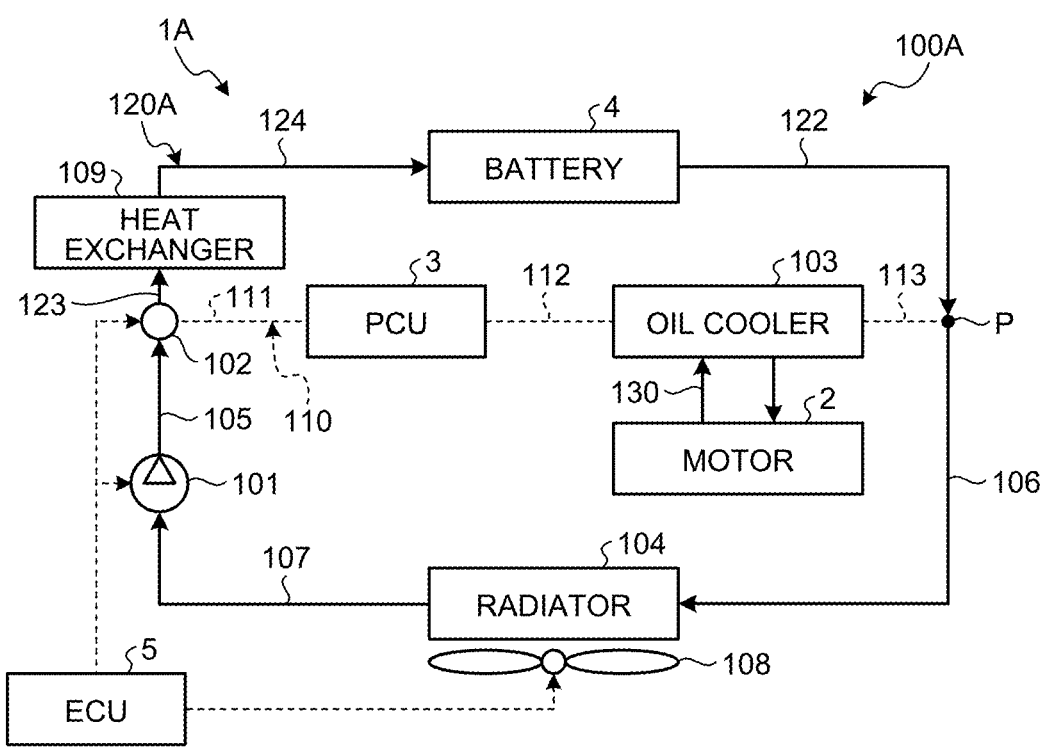
FIG. 10 is a schematic diagram illustrating a route allowing flow through the cooling circuit in a charging state.

FIG. 10 is a schematic diagram illustrating a route allowing flow through the cooling circuit in a charging state. As illustrated in FIG. 10, because, in the charging state, the cooling liquid flows only through the second circuit 120A, heat can be exchanged between the cooling liquid and the refrigerant, in the heat exchanger 109. In this case, it is not always necessary to perform heat exchange in the heat exchanger 109. That is, when a predetermined condition is satisfied during charging, heat exchange in the heat exchanger 109 is performed.

To perform heat exchange in the heat exchanger 109, the ECU 5 operates the compressor of the refrigeration cycle during charging. Because this refrigeration cycle is directed to cool the vehicle cabin, the temperature of the refrigerant in the refrigeration cycle is lower than the temperature of the cooling liquid flowing through the second circuit 120A. Therefore, when the refrigerant and the cooling liquid exchange heat in the heat exchanger 109, the heat of the cooling liquid transfers to the refrigerant, so that the cooling liquid is cooled. Because, in the second circuit 120A, the heat exchanger 109 is disposed on the upstream side of the battery 4, the circulation of the cooling liquid through the second circuit 120A during charging enables the cooling liquid cooled in the heat exchanger 109 to be supplied to the battery 4, thus improving the cooling performance of the battery 4.

Figure 11:
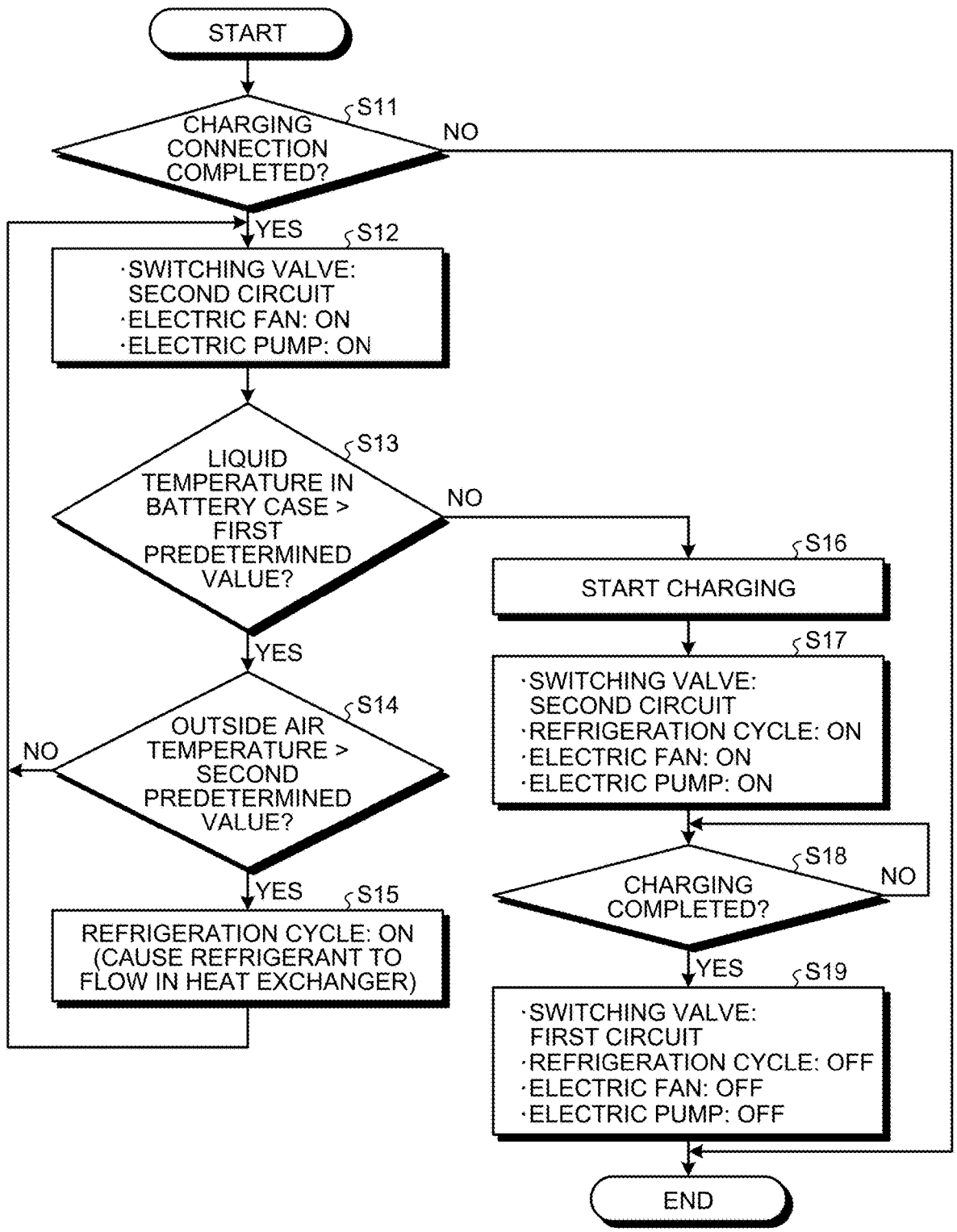
FIG. 11 is a flowchart illustrating a cooling control flow according to the second embodiment.

FIG. 11 is a flowchart illustrating a cooling control flow according to the second embodiment. The control illustrated in FIG. 11 is executed by the ECU 5.

Steps S11 to S13 illustrated in FIG. 11 are the same processes as steps S1 to S3 in FIG. 6 described above. In the second embodiment, the predetermined value in step S3 described above is used as a first predetermined value in a determination process in step S13.

When the temperature of the cooling liquid in the case of the battery 4 is higher than the first predetermined value (step S13: Yes), the ECU 5 determines whether the outside air temperature is higher than a second predetermined value (step S14). For example, the second predetermined value is set to 35° C. The second predetermined value used in step S14 may be set in a range around 35° C.

When the outside air temperature is equal to or lower than the second predetermined value (step S14: No), the control routine returns to step S12. If, in a state of preparation for charging, the temperature of the cooling liquid in the battery 4 exceeds the first predetermined value and the outside air temperature is equal to or lower than the second predetermined value, the ECU 5 performs step S12 to execute precooling before the start of the charging. This precooling does not involve heat exchange in the heat exchanger 109 and is continued until the temperature of the cooling liquid in the battery 4 reaches the first predetermined value or lower.

When the outside air temperature is higher than the second predetermined value (step S14: Yes), the ECU 5 operates the refrigeration cycle (step S15). In step S15, the refrigeration cycle is operated, and the refrigerant of the refrigeration cycle is caused to flow in the heat exchanger 109. When the second predetermined value is set to 35° C., the temperature of the refrigerant flowing in the heat exchanger 109 can be set lower than the outside air temperature by approximately 20° C. or more.

After step S15, the control routine returns to step S12. When the temperature of the cooling liquid in the battery 4 exceeds the first predetermined value in the state of preparation for charging and the outside air temperature exceeds the second predetermined value, the ECU 5 performs steps S12 and S15 to execute precooling before the start of the charging. This precooling involves heat exchange in the heat exchanger 109 and is continued until the temperature of the cooling liquid in the battery 4 reaches the first predetermined value or lower.

When the temperature of the cooling liquid in the case of the battery 4 is equal to or lower than the first predetermined value (step S13: No), the ECU 5 starts charging the battery 4 from an external power supply (step S16). Step S16 is the same process as step S4 in FIG. 6 described above.

In addition, during charging from the external power supply, the ECU 5 controls the switching valve 102 so as to allow flow through the second circuit 120A of the cooling circuit 100A, and operates the refrigeration cycle, the electric fan 108, and the electric pump 101 (step S17). In step S17, as illustrated in FIG. 10 described above, control is executed so that the cooling liquid flows only through the second circuit 120A on the side of the battery 4. Step S17 is main cooling. If only step S12 has been continued as a precooling, the ECU 5 operates the refrigeration cycle, the ECU 5 operates the refrigeration cycle in step S17. Meanwhile, if the steps S12 and S15 have been continued as precooling, the cooling control started in step S15 is continued in the step S17.

The ECU 5 determines whether the charging of the battery 4 from the external power supply has been completed (step S18). Step S18 is the same process as step S6 in FIG. 6 described above.

If the charging from the external power supply has been completed (step S18: Yes), the ECU 5 controls the switching valve 102 so as to allow flow through the first circuit 110 of the cooling circuit 100A, and stops the refrigeration cycle, the electric fan 108, and the electric pump 101 (step S19). In step S19, the first circuit 110 is allowed to be used for flow, but because the electric pump 101 is stopped, the cooling liquid does not flow in the first circuit 110. By performing step S19, the cooling state of battery 4 shifts from cooling by forced convection to cooling by natural convection. After step S19, this control routine ends.

As described above, because, according to the second embodiment, the heat exchanger 109 is disposed on the upstream side of the battery 4 in the second circuit 120A, the cooling liquid cooled by the heat exchanger 109 can be supplied to the battery 4 by causing the refrigerant of the refrigeration cycle to flow through the heat exchanger 109. Thus, the battery 4 during charging, particularly during rapid charging, can be efficiently cooled.

In addition, even when the outside air temperature is high, the temperature of the cooling liquid in the case of the battery 4 can quickly be reduced. Therefore, when the outside air temperature is high, the cooling liquid is cooled by the heat exchanger 109 during the precooling, thereby making it possible to reduce a cooling time (a precooling execution time) taken for the temperature of the cooling liquid in the battery 4 to reach the first predetermined value or lower. Thus, a time taken to start charging from an external power supply can be reduced.

In addition, because, during rapid charging, heat generated by the battery 4 can be dissipated by both the heat exchanger 109 and the radiator 104, a sudden increase of the temperature of the battery 4 can be prevented. Thus, heat load on the electrolyte of the battery cells 40 can be reduced, hindering deterioration of the battery cells 40. Therefore, a decrease in the function of the battery 4 can be hindered.

Note that the configurations of the various examples of the modification described above as the examples of the modification of the first embodiment may also be applied to the second embodiment described above.

The present disclosure includes a cooling circuit in which a first circuit in which a cooling liquid passes through a power control unit and a second circuit in which the cooling liquid passes through a battery are connected in parallel, and the proportion of the flow rate of the cooling liquid of these circuits is controlled by a flow-rate control unit according to a vehicle state. Thus, the battery and the power control unit can be cooled efficiently with a simple structure.

According to an embodiment, the cooling liquid in the module case can be caused to flow diagonally and, therefore, the inside of the module case can be cooled substantially uniformly when the battery cells are cooled by forced convection of the cooling liquid.

According to an embodiment, the battery module is immersed and, therefore, heat generated by the battery during traveling can be dissipated by natural convection of the cooling liquid. Therefore, during traveling, the flow rate of the cooling liquid flowing through the first circuit on the side of the power control unit can be made higher than the flow rate of the cooling liquid flowing through the second circuit and, therefore, the power control unit can be cooled efficiently.

According to an embodiment, in a state of preparation for charging, the flow rate of the cooling liquid flowing through the second circuit on the side of the battery can be made higher than the flow rate of the cooling liquid flowing through the first circuit and, therefore, the battery can be cooled efficiently.

According to an embodiment, the temperature of the battery can be reduced to the predetermined value in a state of preparation for charging and, therefore, it is possible to prevent the battery from becoming too hot during the charging. Thus, a decrease in the performance of the battery can be prevented.

According to an embodiment, the oil of the motor can be cooled with the cooling liquid flowing through the first circuit during traveling. Thus, the motor can be efficiently cooled during the traveling.

According to an embodiment, by operating the electric fan during the stop of the vehicle, an amount of heat dissipated from the radiator can be increased.

According to an embodiment, the heat exchanger is disposed on the upstream side of the battery in the second circuit, the cooling liquid cooled by the heat exchanger can be supplied to the battery during charging.

According to an embodiment, when the outside air temperature is high, the refrigeration cycle is operated to perform heat exchange between the refrigerant and the cooling liquid in the heat exchanger, making it possible to reduce a time taken for the cooling liquid to decrease to the second predetermined value.

According to an embodiment, the cooling liquid can be caused to flow in only the second circuit on the side of the battery during charging and, therefore, the battery can be cooled efficiently.

According to an embodiment, during traveling, the cooling liquid can be caused to flow in only the first circuit on the side of the power control unit and, therefore, the power control unit can be cooled efficiently.

According to an embodiment, the temperature of the battery can be reduced to the predetermined value in a state of preparation for charging and, therefore, it is possible to prevent the battery from becoming too hot during the charging. Thus, a decrease in the performance of the battery can be suppressed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A cooling device for a vehicle, the cooling device comprising:
    a battery to which electric power supplied from an external power supply can be charged;
    a motor that outputs motive power for traveling using the electric power from the battery;
    a power control unit that converts DC electric power of the battery into AC electric power and supplies the AC electric power to the motor;
    a cooling circuit through which a cooling liquid for cooling the battery and the power control unit is circulated;
    an electric pump provided in the cooling circuit and that circulates the cooling liquid;

a radiator provided in the cooling circuit and that dissipates heat from the cooling liquid circulating through the cooling circuit; and a control unit that controls a flow rate of the cooling liquid circulating through the cooling circuit, wherein the cooling circuit includes:

a first circuit in which the cooling liquid discharged from the electric pump circulates through the power control unit;

a second circuit connected in parallel with the first circuit and in which the cooling liquid discharged from the electric pump circulates through the battery without passing through the power control unit; and a flow-rate control unit that controls a proportion of a flow rate of the cooling liquid flowing in the first circuit and a flow rate of the cooling liquid flowing in the second circuit; and wherein the control unit is configured to, when the battery is being charged with the electric power of the external power supply, control the electric pump and the flow-rate control unit so that the flow rate of the cooling liquid flowing through the second circuit on a side of the battery is greater than the flow rate of the cooling liquid flowing through the first circuit on a side of the power control unit.

2. The cooling device for the vehicle, according to claim 1, wherein the battery includes: a plurality of battery modules, each of which includes a plurality of battery cells; and a plurality of module cases housing the battery modules;

wherein, inside each module case, the battery module is immersed in the cooling liquid, and the cooling liquid directly exchanges heat with the battery cells; and wherein when the module case is viewed from above, the module case has a substantially rectangular parallelepiped shape in which an inflow port for the cooling liquid and an outflow port for the cooling liquid are provided near diagonal positions with respect to each other.

3. The cooling device for the vehicle, according to claim 1, wherein the control unit is configured to, during traveling with the motive power output by the motor, control the electric pump and the flow-rate control unit so that the flow rate of the cooling liquid flowing through the first circuit on the side of the power control unit is greater than the flow rate of the cooling liquid flowing through the second circuit on the side of the battery.

4. The cooling device for the vehicle, according to claim 1, wherein the control unit is configured to, when detecting a state of preparation for charging the battery from the external power supply, control the electric pump and the flow-rate control unit so that the flow rate of the cooling liquid flowing through the second circuit on the side of the battery is greater than the flow rate of the cooling liquid flowing through the first circuit on the side of the power control unit.

5. The cooling device for the vehicle, according to claim 4, wherein the control unit is configured to, when the state of preparation for charging is detected and a temperature of the battery exceeds a predetermined value, control the electric pump and the flow-rate control unit until the temperature of the battery reaches the predetermined value or lower so that the flow rate of the cooling liquid flowing through the second circuit on the side of the battery is greater than the flow rate of the cooling liquid flowing through the first circuit on the side of the power control unit.

6. The cooling device for the vehicle, according to claim 1, wherein the first circuit is provided with an oil cooler that exchanges heat between oil for cooling the motor and the cooling liquid.

7. The cooling device for the vehicle, according to claim 1, further comprising an electric fan that sends a current of cooling air to the radiator, wherein the control unit is configured to, when the battery is being charged, operate the electric fan to cool the radiator with the current of cooling air from the electric fan.

8. The cooling device for the vehicle, according to claim 1, wherein the second circuit has a heat exchanger disposed between the flow-rate control unit and the battery and that exchanges heat between a refrigerant of a refrigeration cycle and the cooling liquid, and wherein control unit is configured to, when the battery is being charged, operate the refrigeration cycle and exchange heat between the cooling liquid and the refrigerant in the heat exchanger to cool the cooling liquid.

9. The cooling device for the vehicle, according to claim 8, wherein, in a case where the control unit detects a state of preparation for charging the battery from the external power supply when a temperature of the battery exceeds a predetermined value and an outside air temperature exceeds a second predetermined value, the control unit is configured to operate the refrigeration cycle until the temperature of the battery reaches the predetermined value or lower and exchange heat between the cooling liquid and the refrigerant in the heat exchanger to cool the cooling liquid.

10. The cooling device for the vehicle, according to claim 1, wherein the flow-rate control unit is a switching valve that switches a route along which the cooling liquid is allowed to flow to the first circuit or the second circuit, and the control unit is configured to, when the battery is being charged, control the switching valve to switch the route so that the cooling liquid flows through only the second circuit on the side of the battery among the first circuit and the second circuit.

11. The cooling device for the vehicle, according to claim 10, wherein the control unit is configured to, during traveling with the motive power output by the motor, control the switching valve to switch the route so that the cooling liquid flows through only the first circuit on the side of the power control unit among the first circuit and the second circuit.

12. The cooling device for the vehicle, according to claim 10, wherein, when detecting a state of preparation for charging the battery from the external power supply and a temperature of the battery exceeds a predetermined value, the control unit is configured to control the switching valve until the temperature of the battery reaches the predetermined value or lower to flow the cooling liquid through only the second circuit on the side of the battery among the first circuit and the second circuit.

\* \* \* \* \*